United States Patent
Antoniewicz

(10) Patent No.: US 11,153,330 B1
(45) Date of Patent: Oct. 19, 2021

(54) DETECTION OF DNS (DOMAIN NAME SYSTEM) TUNNELING AND EXFILTRATION THROUGH DNS QUERY ANALYSIS

(71) Applicant: CISCO TECHNOLOGY, INC., San Jose, CA (US)

(72) Inventor: Brad J. Antoniewicz, New Milford, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 404 days.

(21) Appl. No.: 15/897,141

(22) Filed: Feb. 14, 2018

Related U.S. Application Data

(60) Provisional application No. 62/589,995, filed on Nov. 22, 2017.

(51) Int. Cl.
*H04L 29/06* (2006.01)
*H04L 29/12* (2006.01)

(52) U.S. Cl.
CPC ...... *H04L 63/1416* (2013.01); *H04L 61/1511* (2013.01); *H04L 63/1441* (2013.01); *H04L 63/20* (2013.01)

(58) Field of Classification Search
USPC .......... 726/22, 2, 21, 36; 713/150, 163, 181; 380/255, 364, 276
See application file for complete search history.

(56) References Cited

U.S. PATENT DOCUMENTS

| | | | |
|---|---|---|---|
| 9,003,518 B2* | 4/2015 | Wyschogrod | H04L 61/1511 726/22 |
| 9,729,413 B2 | 8/2017 | Cook et al. | |
| 9,794,229 B2* | 10/2017 | Yu | H04L 63/1425 |
| 9,843,601 B2* | 12/2017 | Fakeri-Tabrizi | H04L 63/1441 |
| 9,882,868 B1* | 1/2018 | Williams | H04L 41/0893 |
| 10,412,107 B2* | 9/2019 | Brutzkus | H04L 12/4633 |
| 2016/0055490 A1* | 2/2016 | Keren | G06Q 30/00 705/14.47 |
| 2016/0065535 A1* | 3/2016 | O'Leary | G06F 16/24578 707/728 |
| 2016/0099852 A1* | 4/2016 | Cook | H04L 47/2425 709/224 |
| 2016/0099961 A1* | 4/2016 | Paugh | G06F 16/90335 726/23 |

(Continued)

OTHER PUBLICATIONS

Pedro Marques de Luz,"Botnet Detection Using Passive DNS",mspace. lib.umanitoba.ca, Department of Computing Science,2013/2014.

(Continued)

*Primary Examiner* — Sharif E Ullah

(57) ABSTRACT

In one embodiment, a method includes collecting DNS (Domain Name System) communications, analyzing the DNS communications, and identifying DNS tunneling or exfiltration based analysis of the DNS communications. Analyzing the DNS communications includes identifying a distinct query count for each of a plurality of clients over a specified time period and a data transfer direction between the clients and one or more servers, and categorizing the DNS communications based on session features associated with at least one of query type, transfer capability, and server response. An apparatus and logic are also disclosed herein.

16 Claims, 9 Drawing Sheets

(56) References Cited

U.S. PATENT DOCUMENTS

2017/0318035 A1* 11/2017 Baughman ............... G06N 3/08
2018/0063162 A1* 3/2018 Baughman .......... H04L 63/1441

OTHER PUBLICATIONS

Asaf Nadler,Avi Aminov,Asaf Shabtai,"Detection of Malicious and Low Throughput Data Exfiltration Over the DNS Protocol",arxiv.org,Sep. 25, 2017.

* cited by examiner

DETECTION OF DNS (DOMAIN NAME SYSTEM) TUNNELING AND EXFILTRATION THROUGH DNS QUERY ANALYSIS

STATEMENT OF RELATED APPLICATION

The present application claims priority from U.S. Provisional Application No. 62/589,995, entitled DETECTION OF DNS (DOMAIN NAME SYSTEM) TUNNELING AND EXFILTRATION THROUGH DNS QUERY ANALYSIS, filed on Nov. 22, 2017. The contents of this provisional application are incorporated herein by reference in its entirety.

TECHNICAL FIELD

The present disclosure relates generally to communication networks, and more particularly, to detection of DNS (Domain Name System) tunneling and exfiltration.

BACKGROUND

The Internet is very dependent on the Domain Name System (DNS), which is used for the translation of domain names to network addresses. Malicious entities may use DNS to attack computers or networks by directing a user to a malicious server. DNS tunneling may permit two-way communication that bypasses existing network security, thus allowing attackers to create backdoors. Misuse of DNS infrastructure may also open a way to transfer data from a restricted area. For example, an entity may attempt to embed data in a DNS request and the DNS protocol may be manipulated to act as a file transfer protocol. Cases of malware utilizing DNS to pull payloads are becoming increasingly popular.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
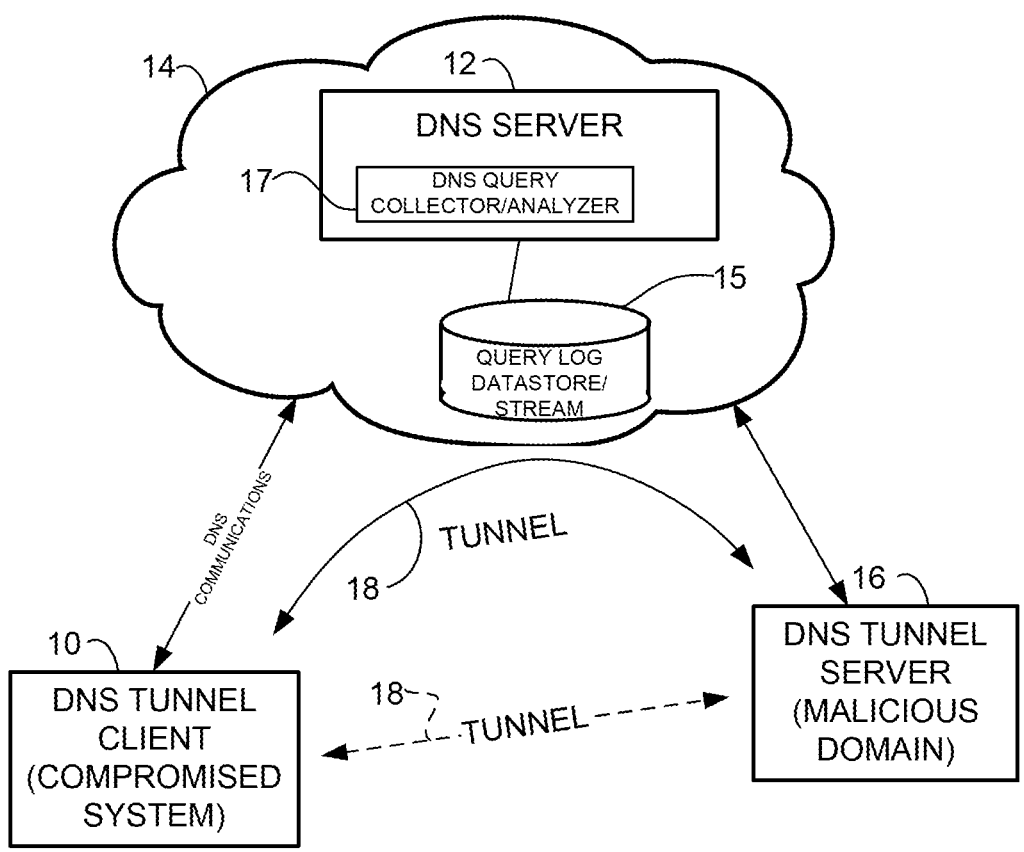
FIG. 1 illustrates an example of a network in which embodiments described herein may be implemented.

In one embodiment, a method generally comprises collecting DNS (Domain Name System) communications, analyzing the DNS communications, and identifying DNS tunneling or exfiltration based on analysis of the DNS communications. Analyzing the DNS communications includes identifying a distinct query count for each of a plurality of clients over a specified time period and a data transfer direction between the clients and one or more servers, and categorizing the DNS communications based on session features associated with at least one of query type, transfer capability, and server response.

In another embodiment, an apparatus generally comprises a DNS communications collector, memory for storing the DNS communications, and a DNS communications analyzer for identifying DNS tunneling or exfiltration based on analysis of the DNS communications. The DNS communications analyzer is configured for identifying a distinct query count for each of a plurality of clients over a specified time period and a data transfer direction between the clients and one or more servers, and categorizing the DNS communications based on session features associated with at least one of query type, transfer capability, and server response.

In yet another embodiment, logic is encoded on one or more non-transitory computer readable media for execution and when executed operable to analyze DNS communications and identify DNS tunneling or exfiltration based on analysis of the DNS communications. Analyzing the DNS communications generally comprises identifying a distinct query count for each of a plurality of clients over a specified time period and a data transfer direction between the clients and one or more servers, and categorizing DNS communications based on session features associated with at least one of query type, transfer capability, and server response.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

The Domain Name System (DNS) is a naming system for computers, services, or any resource connected to the Internet or private network and may be used to associate information with domain names assigned to participating entities. More specifically, DNS is a distributed naming system that provides a mapping between IP (Internet Protocol) addresses and domain names and allows network resources to request IP address information relating to a particular domain name. DNS has a defined use in standard networks and because of this, DNS traffic often goes unnoticed, which makes it an appealing protocol for attackers. DNS may be used for malicious purposes, such as DNS spoofing, creation of fake websites, stealing data, and C&C (control and command) communication.

At a basic level, as DNS packets transverse a network and make their way through recursive servers to an authoritative name server for a domain, they form a very basic and often unscrutinized communications channel. Certain record types allow for arbitrary data within the payload of the resource record, turning this mostly unidirectional channel into a bidirectional one. While some record types allow for more data to be transferred than others, all record types allow for some basic amount of data to be returned and creative attacks may abuse this. One or more embodiments may be used to identify attacks across all record types.

This simple abuse of the protocol results in a way for attackers to exfiltrate data from a network, build a command and control channel to an Internet-based server, and establish a tunnel to encompass more robust protocols. For example, botnets (collections of malicious software agents) may use DNS as a component of their command and control communication or domain fluxing may be used for command and control of a botnet. Random domain names may also be generated in order to avoid detection. DNS may be used to create a covert channel for the exfiltration of data to a remote server without being blocked or detected by security. In one example, tunneling may be used to establish a communication channel over DNS and malware communication may be used as a channel for the exfiltration of data (e.g., user credentials, key-logging, credit card numbers, geographical locations, etc.).

The embodiments described herein are directed to detection of DNS tunneling or exfiltration through DNS query analysis. As described in detail below, one or more embodiments may use DNS queries to identify behavioral anomalies that are indicative of DNS abuse (e.g., tunneling, exfiltration). In one or more embodiments, a distinct query count per client by registered level domain (RLD) over a fixed time period may be used to indicate DNS abuse. The RLD calculation may be configured to account for widely abused dynamic DNS providers, treating them as public suffixes. In one or more embodiments, query type and server response may be used to categorize bidirectional and attacker-to-client unidirectional transfer, lexical analysis may be used to detect data fields, active probing may be used to identify client-to-attacker unidirectional transfers, or any combination of these or other mechanisms may be used to further identify DNS tunneling or exfiltration.

It is to be understood that the term "DNS tunneling or exfiltration" as used herein refers to any type of DNS abuse including, for example, DNS tunneling, DNS exfiltration, DNS for command and control traffic, DNS for payload transfer, and the like.

Referring now to the drawings, and first to FIG. 1, a simplified network in which embodiments described herein may be implemented is shown. The embodiments operate in the context of a data communication network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data within the network. The nodes may communicate over one or more networks (e.g., local area network (LAN), metropolitan area network (MAN), wide area network (WAN), virtual private network (VPN), virtual local area network (VLAN), wireless network, enterprise network, corporate network, Internet, intranet, radio access network, public switched network, or any other network). Network traffic may also travel between a main campus and remote branches or any other networks.

In the simplified example shown in FIG. 1, a DNS tunnel 18 is created between a DNS tunnel client 10 with a compromised system and a DNS tunnel server (malicious domain, attacker) 16. The tunnel 18 may occur directly from the compromised system to the attacker-controlled server (as shown by the dashed line in FIG. 1) or the tunnel may extend to the compromised system using the DNS service as a proxy to the attacker-controlled server (as shown by the tunnel 18 passing through network 14).

The attacker device 16 and one or more compromised devices 10 may form one or more DNS tunnels 18. The tunnel 18 may be used to transfer data between the client 10 and server 16. For example, a user password hosted on the compromised machine 10 may be unwillingly sent to the attacker 16 via a DNS query. DNS protocols may be used to tunnel other protocols (e.g., Hypertext Transport Protocol (HTTP), Secure Socket Layer (SSL) protocol, etc.). In one example, DNS tunneling techniques may be used to establish a bidirectional communication channel over DNS. The attacker device 16 may also be used for data exfiltration (e.g., data leakage such as file transfers using DNS). For example, malware communications may be used as a unidirectional channel for the exfiltration of data. The data tunneling or exfiltration may be used to gain access to resources by bypassing other methods of network protection.

In the example shown in FIG. 1, DNS data and communications are directed to the server 16 by a DNS server 12 located in network 14. The DNS system may comprise any number of components (DNS servers, recursive DNS servers, authoritative DNS servers, resolvers, etc.). The DNS system stores a mapping between IP addresses and domain names and may also store additional information related to domains, such as Authoritative Name Server (ANS), domain aliases (CNAME records), mail exchanger (MX records), general information (TXT records), etc. Each piece of information is stored in its own Resource Record (RR), (e.g., A (IPv4 addresses), AAAA (IPv6 addresses), NS (Name Server)). A domain name may include a plurality of domains (e.g., top level domain, second level domain, third level domain). The second level domain may be referred to as a subdomain of the top level domain.

Each domain has at least one authoritative DNS server that publishes information about the domain and name servers of any domains subordinate to it. There may be any number of servers in the authoritative DNS hierarchy. For example, the client (endpoint, host, virtual machine) 10 may transmit a request to a recursive DNS server to find the IP address associated with a website. If the recursive DNS server does not have the DNS record cached, it may contact the authoritative server (or other server such as a root DNS server or top level domain server in the authoritative DNS hierarchy). Attackers may use recursion to deny the DNS server service. DNS tunneling and exfiltration techniques may use unique subdomains and resource record (RR) responses, as discussed below.

Malicious entities may use the above described devices or services to initiate an attack. For example, the malicious entity 16 (e.g., control site or lateral scan victim) may attempt to insert itself into a network to attack a client (host). The malicious entity 16 may be installed as a direct attack on a system. The malicious entity 16 may contact the host via one or more networks 14 (e.g., data center, Internet). Traffic from the host may be directed to the malicious entity 16 by a DNS device (e.g., compromised device or device inserted into the network by the malicious entity).

The DNS server 12 may be any suitable server that is responsible for providing mapping between IP addresses and domain names and operable to communicate with devices in the same network or different networks using the DNS protocol. In the example shown in FIG. 1, data is collected at a DNS query (communications) collector/analyzer 17 and stored in a database 15 (query (communications) log datastore/stream). The database 15 may also be located at one or more DNS servers 12, in one or more networks, or distributed across multiple network devices or in the cloud.

In one or more embodiments, the DNS system includes the DNS query collector and analyzer 17, which may be located at the DNS server 12, or another network device, or distributed over one or more network devices in communication with the database (query log datastore/stream) 15. For example, an agent may operate on one or more DNS servers (or other network device or cloud) to collect queries periodically or in real time, and send DNS queries to database 15. The DNS query collector and analyzer 17 may operate at any computer or network device (e.g., server, controller, appliance, management station, or other processing device or network element) operable to receive network data (e.g., DNS communications (queries, responses, data)) and, based on the received information, detect DNS tunneling (e.g., malicious DNS tunneling activities) or exfiltration (e.g., data transfer from restricted area) through DNS communications analysis. As described in detail below, the DNS query collector and analyzer 17 may be used to identify inconsistencies and detect malware or DNS tunnels and prevent future attacks.

The DNS tunnel server 16 may also be in communication with other DNS tunnel clients. The DNS query collector/analyzer 17 may collect DNS communications from any number of clients 10 and servers 16. The term "DNS communications" as used herein may refer to queries, responses, or data transmitted between the client 10 and server 16 (e.g., unidirectional communications, bidirectional communications) that may be collected and analyzed at the DNS communications collector/analyzer 17 for use in detecting DNS abuse (e.g., DNS tunneling or exfiltration).

It is to be understood that the network devices and topology shown in FIG. 1 and described above are only examples and the embodiments described herein may be implemented in networks comprising different network topologies or network devices, or using different protocols, without departing from the scope of the embodiments. Thus, the embodiments described herein for detection of DNS tunneling and exfiltration may be used in any network topology comprising any number or arrangement of data sensors, collectors, or analyzers.

The network may include any number or type of network devices that facilitate passage of data over the network (e.g., routers, switches, gateways, controllers, appliances), network elements that operate as endpoints or hosts (e.g., servers, virtual machines, clients), and any number of network sites or domains in communication with any number of networks.

Moreover, the topology illustrated in FIG. 1 and described above is readily scalable and may accommodate a large number of components, as well as more complicated arrangements and configurations. For example, the network may include any number of networks, which may be geographically dispersed or located in the same geographic area. Thus, network nodes may be used in any suitable network topology, which may include any number of servers, virtual machines, switches, routers, appliances, controllers, gateways, or other nodes interconnected to form a large and complex network, which may include cloud or fog computing. Nodes may be coupled to other nodes or networks through one or more interfaces employing any suitable wired or wireless connection, which provides a viable pathway for electronic communications.

Figure 2:
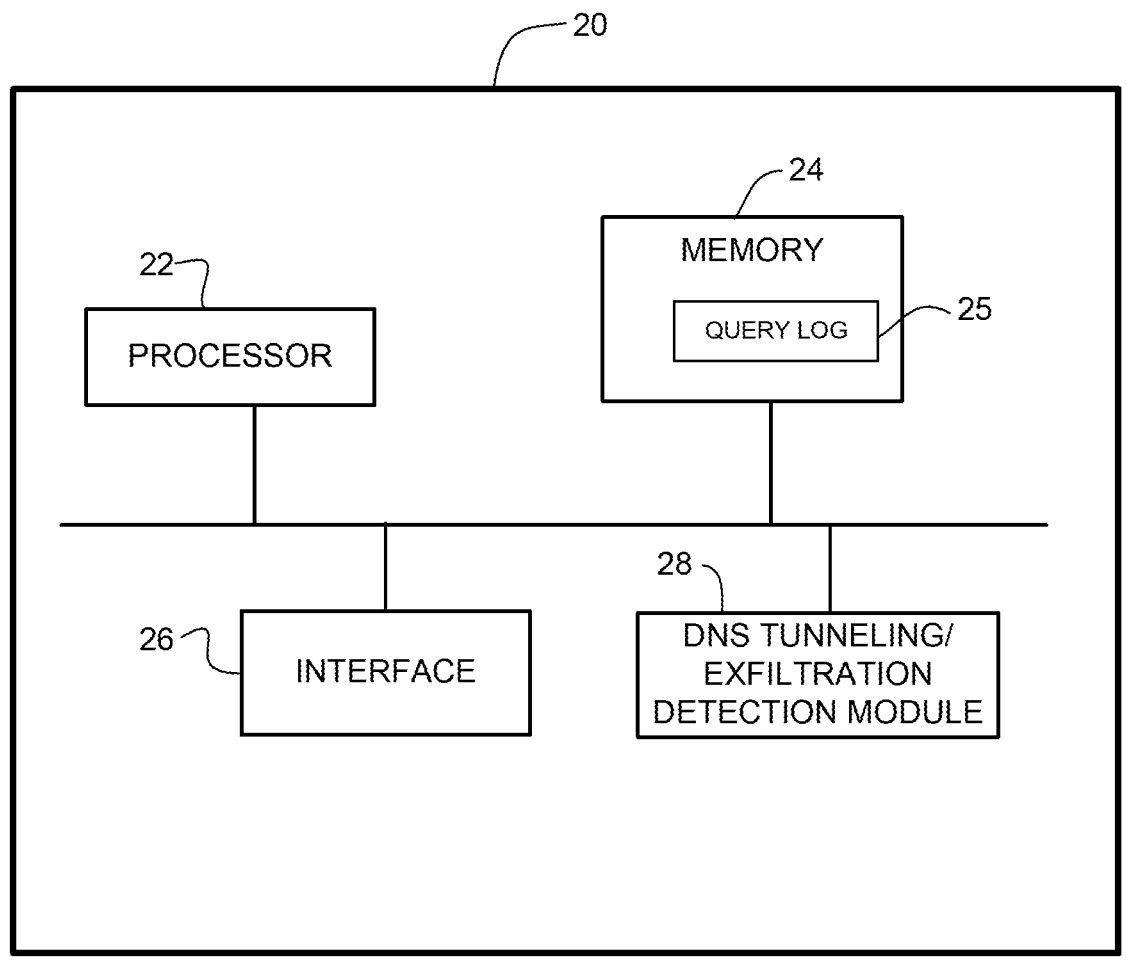
FIG. 2 depicts an example of a network device useful in implementing embodiments described herein.

FIG. 2 illustrates an example of a network device 20 that may be used to implement the embodiments described herein. In one embodiment, the network device 20 is a programmable machine that may be implemented in hardware, software, or any combination thereof. The network device 20 includes one or more processor 22, memory 24, network interface 26, and DNS tunneling/exfiltration detection module 28 (e.g., DNS communications collector and analyzer 17 shown in FIG. 1).

Memory 24 may be a volatile memory or non-volatile storage, which stores various applications, operating systems, modules, and data for execution and use by the processor 22. For example, DNS tunneling and exfiltration detection components (e.g., module, code, logic, software, firmware, etc.) may be stored in memory 24. A query log 25 (e.g., DNS communications datastore/datastream 15 of FIG. 1) may be stored in memory 24. The device 20 may include any number of memory components.

Logic may be encoded in one or more tangible media for execution by the processor 22. For example, the processor 22 may execute codes stored in a computer-readable medium such as memory 24 to perform the processes described below with respect to FIGS. 8A, 8B, and 9. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. The network device 20 may include any number of processors 22. In one example, the computer-readable medium comprises a non-transitory computer-readable medium.

The network interface 26 may comprise any number of interfaces (linecards, ports) for receiving data or transmitting data to other devices. The network interface 26 may include, for example, an Ethernet interface for connection to a computer or network. The network interface 26 may be configured to transmit or receive data using a variety of different communication protocols. The interface may include mechanical, electrical, and signaling circuitry for communicating data over physical links coupled to the network. The network device 20 may further include any number of input or output devices.

It is to be understood that the network device 20 shown in FIG. 2 and described above is only an example and that different configurations of network devices may be used. For example, the network device 20 may further include any suitable combination of hardware, software, processors, devices, components, modules, or elements operable to facilitate the capabilities described herein.

As previously described, DNS communications collected and stored at database 15 may be analyzed to identify DNS abuse (e.g., DNS tunneling or exfiltration) (FIG. 1). In one or more embodiments, DNS tunneling or exfiltration detection may be performed through DNS communications (query, response, query and response, data) analysis including, for example, distinct query count per client and per direction over a fixed period of time, as described in detail below. The DNS communications may also be classified (e.g., query type categorized based on transfer capability and diversity). In one or more embodiments, dynamic DNS domains may be treated as public suffixes so that domain analysis is not tainted by non-DNS abuse traffic. As described below, prefiltering may be performed before query analysis (e.g., to detect known commercial instances, high traffic domains, etc.) or after query analysis (e.g., to detect block list). Additional tools such as active interrogation may also be used, as described below.

In one or more embodiments, a distinct DNS query count associated with a particular registered level-domain (RLD) for a particular client is the starting point in detecting DNS abuse (e.g., using the DNS protocol for purposes outside of that defined in the associated RFC, often for data and command transfer). Standard client communications may involve hundreds of DNS queries, involving many different RLDs. In the case of DNS abuse, however, a single client may make hundreds of unique queries to the subdomains of a single RLD, as shown in FIG. 3.

Figure 3:
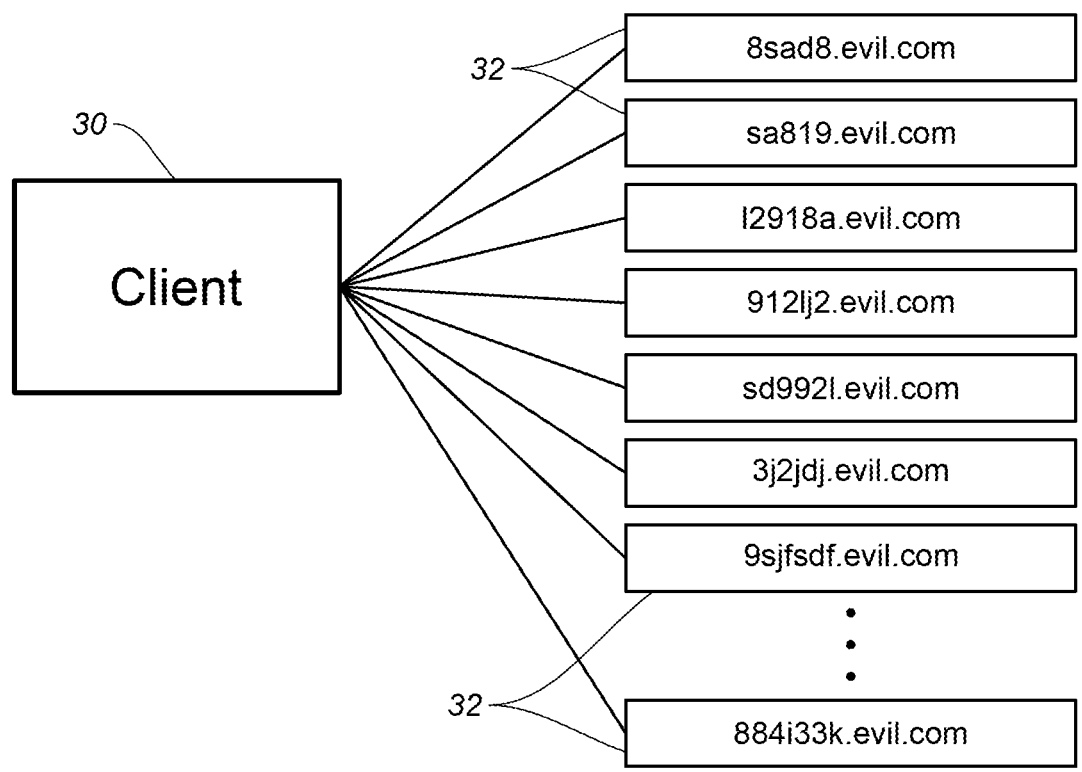
FIG. 3 illustrates an example of DNS abuse traffic with queries to subdomains of a registered level-domain.

FIG. 3 illustrates an example of a client 30 transmitting a large number (e.g., hundreds or more) of unique queries 32 to the subdomain of a single RLD (evil.com). Distinct query count for a plurality of clients 30 may be monitored over a specified time period (e.g., 1 minute, 5 minutes, 60 minutes, or any other time period) based on the type of threat and the amount of data transferred. Most tools and malware can be identified in shorter time periods, however, advanced threats that are intentionally evading detection may spread these messages across longer time periods.

The potential age of the domain may also be identified to determine if the domain has been seen before or if it is new.

In one or more embodiments, distinct query count per client per RLD is calculated over a fixed time period. The calculation may also be based on data transfer direction and categorization of query type, as described below.

Figure 4:
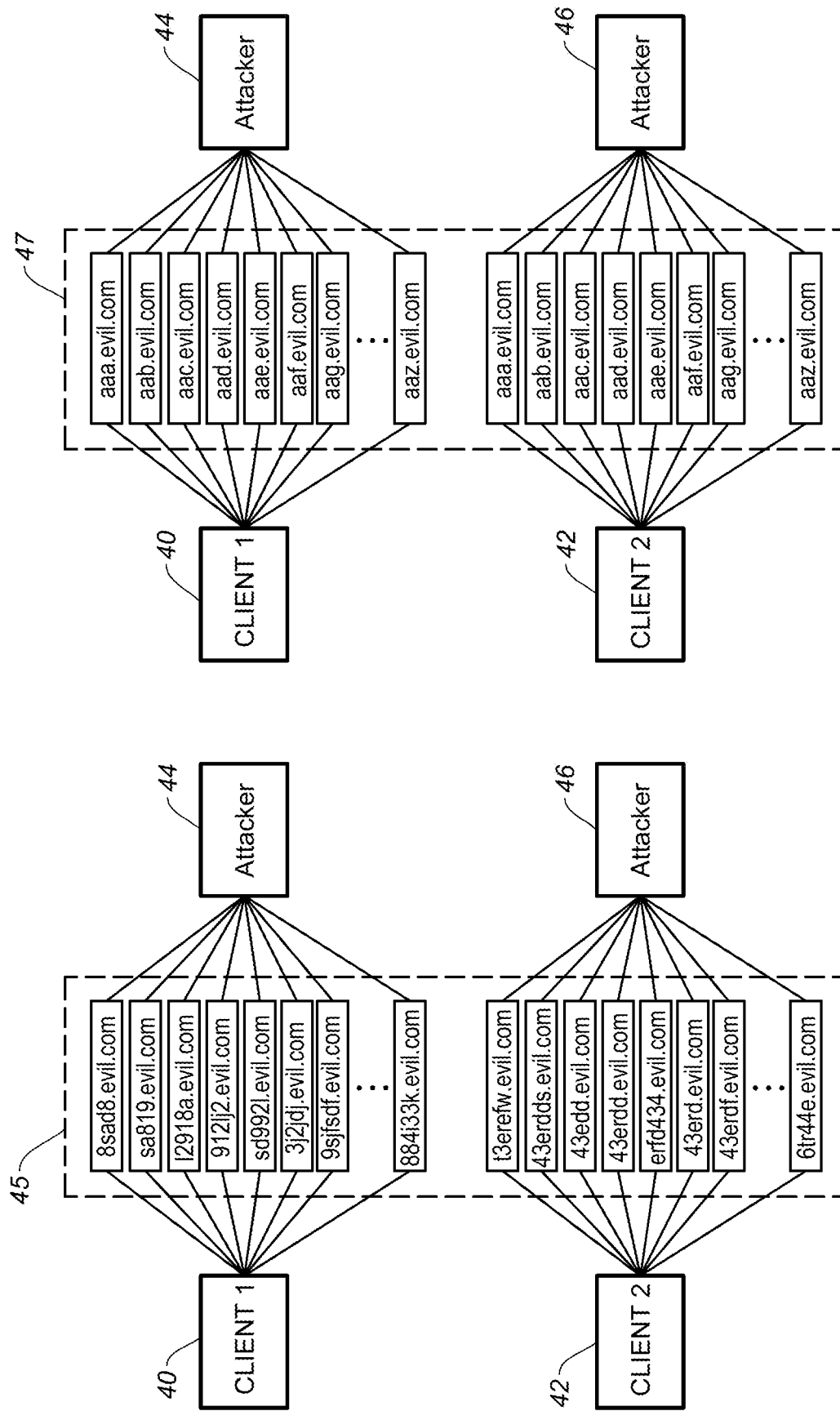
FIG. 4A illustrates an example of client-to-attacker communication with unique queries across clients.
FIG. 4B illustrates an example of attacker-to-client communication with duplicate queries across clients.

The per client breakdown is important with regard to data transfer direction as the direction in which data is being transferred between the client and the attacker may impact the query count over many users. FIG. 4A illustrates client-to-attacker communications. In this example, there are unique queries 45 across client 1 (40) and client 2 (42) directed towards attackers 44, 46, respectively. For unidirectional client-to-attacker transfers, data is embedded within the label of the query 45, producing mostly globally-unique requests (across all clients) (FIG. 4A).

FIG. 4B illustrates attacker-to-client communications with duplicate queries 47 across client 1 and client 2. For unidirectional attacker-to-client transfers, data is provided in the response to the initial client request, often resulting in duplicate queries 47 across clients 40, 42. With bidirectional traffic between the client 40, 42 and the attacker 44, 46, both the queries originating from the client and the responses to those queries are unique across all messages.

In one or more embodiments, analysis of the DNS communications includes classification. DNS abuse broadly defines both malicious and non-malicious behavior and thus it is important to set basic classifications as each needs different handling. In one or more embodiments, various attributes of communications between the client and the attacker may be used to reduce false positives and increase assurance in appropriately convicting DNS abuse. As described below, features may be broken up into session features, lexical features, and active profiling.

Session features apply to the behavior within the traffic between the client and the authoritative server (attacker). Session features may include, for example, transfer capability categorization by query type, query type diversity, transfer capability categorization by server response, usage categorization based on client count, or any combination of these or other session features.

The query type of the client request provides insight into the type of DNS abuse and may aid in categorization. For example, query types such as NULL, TXT, and KEY facilitate bidirectional communication as they support arbitrary data to be included within the response to the client. To a lesser extent, query types such as MX (mail exchanger) and CNAME (canonical name) also support arbitrary data. A (IPv4 address) and AAAA (IPv6 address) records are among the most common query types in standard traffic and thus are often used in more covert attacks. A and AAAA records have limited capabilities for bidirectional traffic and therefore are most commonly used in client-to-attacker communication, such as during an exfiltration attempt.

Figure 5:
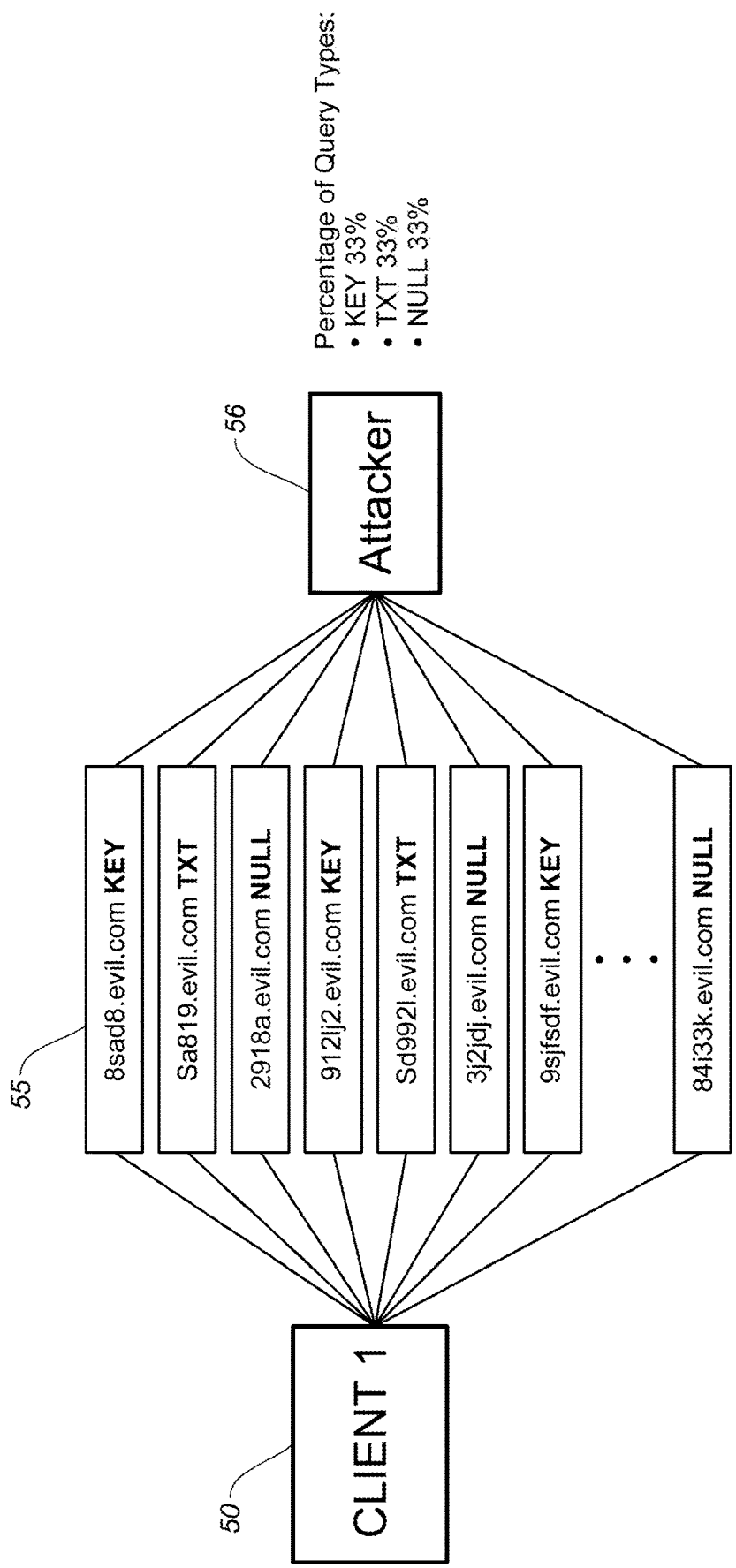
FIG. 5 illustrates an example of query type evasion detection.

In one or more embodiments, query types are categorized by their transfer capability to identify the overall goal of the attacker and thereby add flexibility into the design. An example of query type categorization is as follows:
Bidirectional Traffic: NULL, TXT, MX, and KEY
Unidirectional Traffic: A, AAAA Classification of the DNS communication may also be based on query type. An attacker may attempt to evade detection by using multiple query types. This evasion can be detected by determining if an equal percentage (e.g., +−3% or any other suitable percentage) of total queries is represented by each query type. In the example show in FIG. 5, a client 50 sends a plurality of queries 55 to attacker 56. The percentage of query types is 33% KEY, 33% TXT, and 33% NULL. Since the percentage of query types is equal, the traffic may be DNS abuse traffic.

Another type of classification may be based on transfer capability categorization by server response. Authoritative name servers may respond with NOERROR (no error), SRVFAIL (server fail), or NXDOMAIN (non-existent domain) in normal traffic. These responses aid in determining the transfer capability, however, they may also be used to evade detection in unicast traffic by returning NXDOMAIN or SRVFAIL while still processing the response. In practice, this type of evasion is usually all or none, meaning the attacker returns all SRVFAIL/NXDOMAIN or all NOERROR. Taking this all into account, an example of this type of categorizations is as follows:
Bidirectional Traffic: NOERROR (5% account for failure)
Unidirectional Traffic Evasion: 95% NOERROR or 95% SRVFAIL/NXDOMAIN Usage categorization may also be based on client count. DNS abuse may be used in a variety of malicious and non-malicious cases and therefore a rough estimate of popularity may be determined through the total number of clients by RLD. Popular services such as Antivirus, VPN, WiFi Access, and security products will most commonly have more than twenty clients in a specific time period. Tunneling tools being used for a single transfer will commonly have only a single client and malware may have between one and ten clients.

Feature filters often provide enough evidence to convict commercial DNS abuse (e.g., bidirectional, high data transfer rates), and unidirectional attacker-to-client traffic due to the fact that they use suspicious query types (TXT, KEY, NULL) and need to successfully return a response (very little SRVFAIL or NXDOMAIN).

The third type of session feature that may be used for classification are lexical features. Lexical features describe the characters within the query itself. This is most often used to identify client-to-attacker (both unidirectional and bidirectional) traffic, however, in many cases it can be used to identify unidirectional attacker-to-client traffic as, in practice, the originating client queries are unique.

Lexical filters operate mostly on client-to-attacker unidirectional traffic by analyzing a sample of queries and determining if an available data field exists and estimates approximately how much data may have been sent using this data field. False positives may be removed by using natural language detection.

IETF RFC 1035 (DOMAIN NAMES—IMPLEMENTATION AND SPECIFICATION, P. Mockapetris, November 1987) defines the composition of query names. Some tools that facilitate DNS abuse may generate queries that violate this composition. For example, dns2tcp and iodine both include special ASCII characters that are not permitted by RFC 1035. Pattern matching may be used to detect and convict queries that match this trait. Example dns2tcp traffic shows this (e.g., '=', '/' and '+' are not accepted as per the RFC):

AAAAAF/BAA.=auth.evil.com
AAAAAF/BAA.=auth.evil.com
5Z+FgAABADY0QzMTcxMzc3QTVGMDRFNzZDN-
    ENCRjEwQjdC
    NTYwREM.=auth.evil.com
5Z+FgAABADY0QzMTcxMzc3QTVGMDRFNzZDN-
    ENCRjEwQjdC
    NTYwREM.=auth.evil.com Signature-based encoding detection may also be used to identify lexical features. Due to the message format and encoding, some malware may easily be detected through signature-based methods. For example, PISLoader/PlugX uses a Base32 encoding technique and a message format that results in a sequence of 5 lower-case "a" characters in the center of lowermost label, as described below. Such pattern matching may be used as a first pass filter to determine and classify known instances, as shown in the examples below:

n5r_bwaaaaaaaaaaaaaaaaaaaaaaaaeh.z.evil.com.
n5r_bwaaaaaaaaaaaaaaaaaaaaaaaage.z.evil.com.
n5r_bwaaaaaaaaaaaaaaaaaaaaaaaand.z.evil.com.
n5r_bwaaaaaaaaaaaaaaaaaaaaaaaai6.z.evil.com.
n5r_bwaaaaaaaaaaaaaaaaaaaaaaaaib.z.evil.com.

Figure 6:
FIG. 6 is a table showing an example of thresholds for label lengths and query name lengths.

Classification under lexical features may also be based on label and query name lengths. RFC 1035 defines individual label lengths of up to 63 characters and a total query name not to exceed 254 characters. To facilitate transferring large amounts of data in bidirectional and client-to-attacker unidirectional traffic many instances of DNS abuse may come close to the upward bounds of these limits. Setting thresholds between the 75th and maximum values for query name and label length, as shown in table 60 of FIG. 6, provides further confidence in DNS abuse convictions.

Label length variance may also be used to identify malicious behavior. Malware and tools that leverage DNS abuse may chunk data into equal sizes and split it up across many messages. This often results in the majority of queries with sample query name length that can be identified by a zero variance in the length in a large sampling of messages, as shown below:

02b0696e33 dd.1.evil.com.
02d8beefacba.3.evil.com.
032c52b0d5f3.2.evil.com.
04e66d4d2867.1.evil.com.
058fdbe42a6a.2.evil.com.
061326141e45.2.evil.com.
06ff0476e327.2.evil.com.
078f8ff28fdc.2.evil.com.

Figure 7:
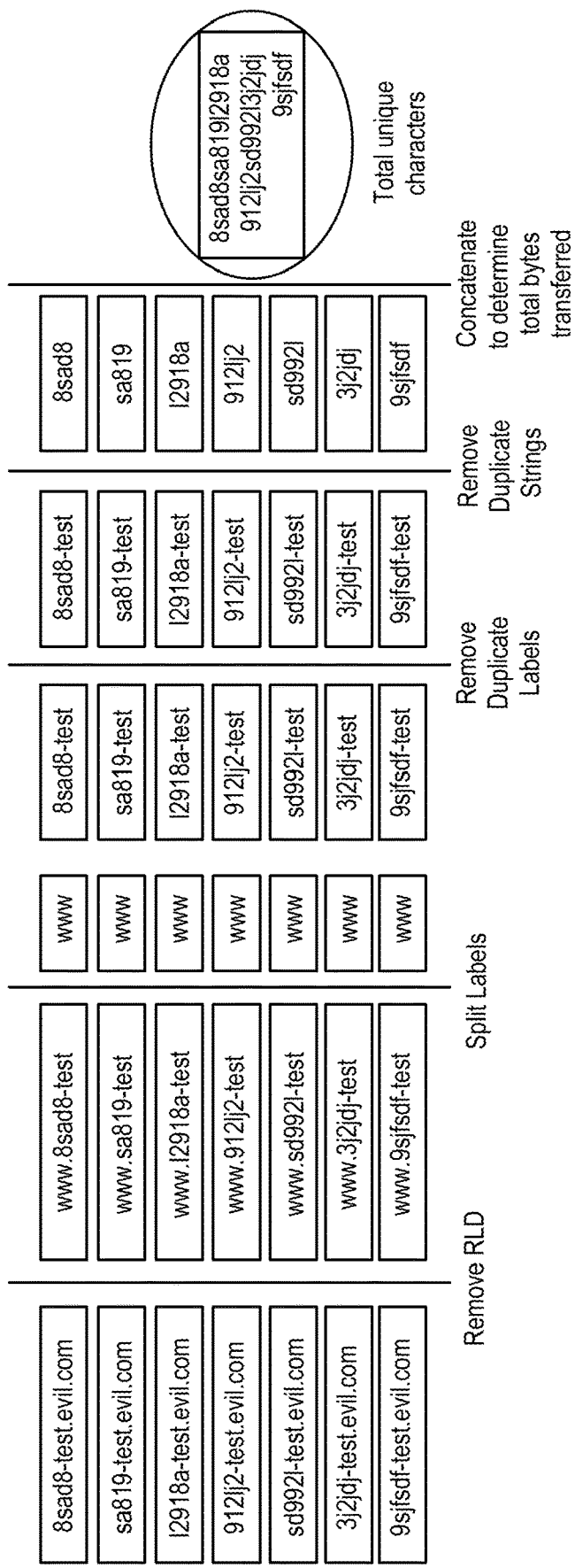
FIG. 7 illustrates an example of a data field detection technique.

Data field detection is another lexical feature classification tool that may be used for DNS abuse traffic detection. Malicious cases of DNS abuse commonly includes additional characters in the labels of queries to evade entropy calculations or visual inspection (e.g. "corp", "www", "test"). Thus, it is important to distill the query name down to just the characters that make each query distinct and are used for data transfer. FIG. 7 illustrates an example of a data field detection technique that reveals the total unique characters and thus the total bytes transferred. Exfiltration attempts may aim to transfer a few thousand bytes per session and may be identified by setting a threshold based on acceptable risk.

In one or more embodiments, natural language detection may be used to reduce false positives. For example, the total unique character string developed in the prior steps may be examined to identify the presence of English words. If the number of English words exceeds a threshold then the instance may be considered a false positive.

As a final threshold for avoiding false positives, all domains may be passed through a popularity filter. This excludes commercial instances of DNS abuse as they can often be categorized at a one-time basis and removed for future instances.

In one or more embodiments, active interrogation may be used. In many cases, actively probing a suspected authoritative name server may definitively convict a case of DNS abuse and may be used for cases where prior methods result in low confidence. In some cases, if no other determination is made, active interrogation may be used to pull in additional data about the RLD and perhaps even replay the query to perform payload analysis. A domain whois lookup may also be performed to identify if the registrant is on any prior whitelists.

Conviction may also be based on testing mechanisms or through payload analysis. For example, built-in testing mechanisms may be used to ensure that the authoritative name server is properly functioning and able to accept DNS tunnels. In one example, by sending a request, such as the one provided below, to a server running the iodine tool will confirm its function and thus contribute to its conviction:

dig -t TXT zaaa.test.evil.com

The response from the authoritative name server may provide clear evidence of DNS abuse and thus by replaying an already transmitted query (or by observing the response passively) the returned payload may clearly show large amounts of encrypted data or even plain text commands.

In order to avoid false positives, certain considerations may also be made, such as DNS-based block lists and dynamic DNS. DNS-based block lists offer a fast means of checking the reputation of a domain, IP, or hash by embedding it into the query name, and returning NXDOMAIN or NOERROR to indicate if the entity has a good or bad reputation. Lexical analysis to detect the presence of domains and IPs within the query name may be used in combination with server response to determine if the RLD under inspection appears to be a DNS-based block list.

As previously noted, dynamic DNS is commonly used in one-time DNS abuse cases as it reduces the complexity of setting up required infrastructure. Treating dynamic DNS domains as public suffixes allows for the proper processing of these cases so that the RLD analysis is not tainted by non-DNS abuse traffic.

Figure 8A:
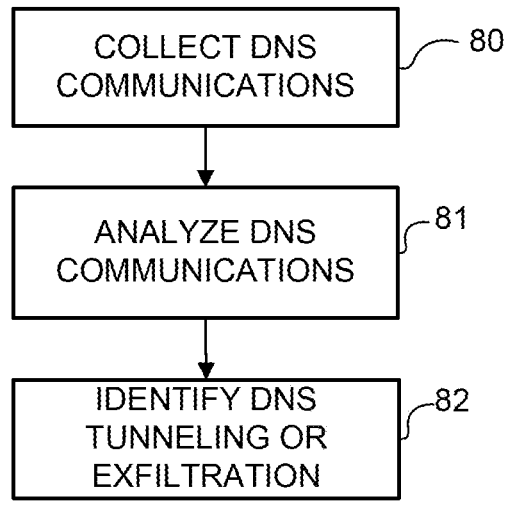
FIG. 8A is a flowchart illustrating an overview of DNS tunneling and exfiltration detection, in accordance with one embodiment.

FIG. 8A is a flowchart illustrating an overview of a process for detecting DNS tunneling or exfiltration through DNS query analysis, in accordance with one embodiment. DNS communications (queries, responses, data) are collected at the DNS communications collector/analyzer 17 (step 80 (FIGS. 1 and 8A). The DNS communications are analyzed (step 81). Based on the analysis, DNS tunneling or exfiltration (DNS abuse) is identified (step 82).

Figure 8B:
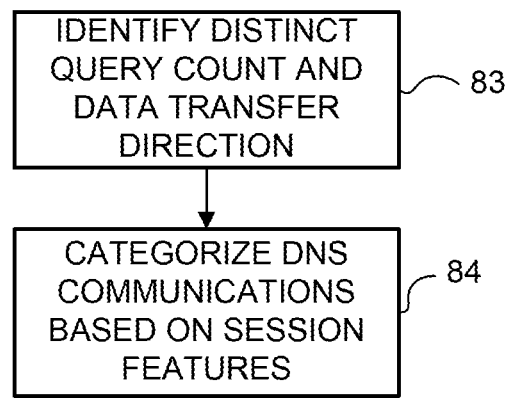
FIG. 8B is a flowchart illustrating a process for analyzing DNS communications, in accordance with one embodiment.

FIG. 8B illustrates a process for analyzing DNS communications, in accordance with one embodiment. A distinct query count for each of a plurality of clients over a specified time period and a data transfer direction between the clients and servers at opposite ends of DNS tunnels are identified (step 83). The DNS communications are categorized based on session features associated with query type, transfer capability, and server response (step 84). For example, as previously described, DNS communications may be categorized based on transfer capability based on query type, server response, client count, or any combination of these or other features. Query type diversity may also be identified. Additional features such as lexical features (label and query length, label length variance, data field detection) may also be identified for use in analysis of the DNS communications.

It is to be understood that the processes shown in FIGS. 8A and 8B and described above, are only examples and that steps may be added, modified, deleted, or combined, without departing from the scope of the embodiments. For example, prefiltering or active interrogation may be included.

Figure 9:
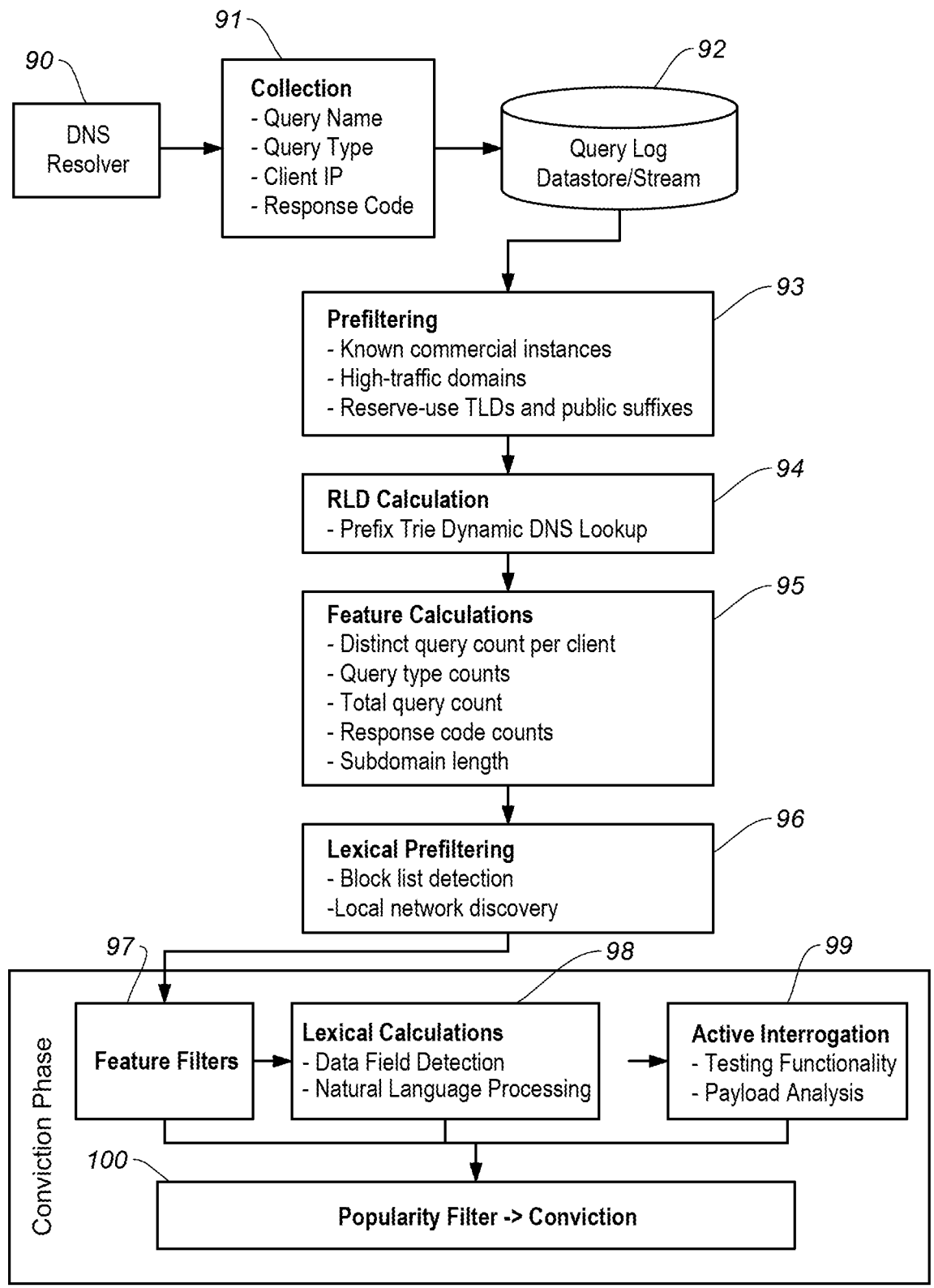
FIG. 9 illustrates additional details of the processes shown in FIGS. 8A and 8B, in accordance with one embodiment.

FIG. 9 illustrates additional details for the processes shown in FIGS. 8A and 8B, in accordance with one embodiment. A recursive DNS server or DNS resolver 90 with a response caching mechanism may perform the initial step in the collection of DNS data at collector 91 and then pass it onto a datastore or streaming queue 92 for consumption later in the pipeline. A prefiltering step 93 may be used to remove high traffic domains, known commercial instances of DNS abuse, and reserve use TLDs (top level domains) to reduce the data set and improve speed. The resultant RLD may be calculated to account for dynamic DNS providers as they may skew data later in the pipeline due to their reliance on unique subdomains (step 94). Feature calculations (step 95) further prepare the data by extracting behavioral traits of DNS abuse, while lexical prefiltering (step 96) removes DNS block lists and special case instances of local network discovery performed by web browsers.

In one or more embodiments, the output of lexical prefiltering (step 96) is input to a conviction phase. The conviction phase utilizes each of the calculated feature filters (97), performs lexical calculations (98), and may also perform active interrogation (99) to make a determination classifying the instance of DNS abuse. Once a conviction determination is made the domain may be passed through a volume-based popularity filter (100) to avoid high impact false positives and if the domain is below a specified popularity threshold, it is considered a conviction.

It is to be understood that the process and components shown in FIG. 9 and described above is only an example, and steps may be modified, combined, added, or removed or components modified, without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    collecting and storing DNS (Domain Name System) communications comprising query and response information;
    analyzing said stored DNS communications; and
    identifying DNS tunneling or exfiltration based on analysis of said DNS communications;
    wherein analyzing said DNS communications comprises:
        identifying a distinct query count associated with a registered level-domain for each of a plurality of clients over a specified time period and a data transfer direction between said plurality of clients and one or more servers; and
        categorizing said DNS communications based on session features associated with query type, wherein said categorization is based on transfer capability, server response, and query type diversity.

2. The method of claim 1 wherein said DNS communications comprise queries and analyzing said DNS communications further comprises analyzing lexical features of said queries.

3. The method of claim 1 wherein categorizing said DNS communications comprises categorizing usage based on client count.

4. The method of claim 1 further comprising prefiltering said DNS communications before analyzing said DNS communications.

5. The method of claim 1 further comprising actively probing a suspected authoritative name server.

6. The method of claim 1 wherein analyzing said DNS communications comprises analyzing a payload of a response.

7. The method of claim 1 wherein dynamic DNS domains are identified as public suffixes.

8. An apparatus comprising:
    a DNS (Domain Name System) communications collector for collecting query and response information;
    memory for storing said DNS communications; and
    a DNS communications analyzer for identifying DNS tunneling or exfiltration based on analysis of said stored DNS communications;
    wherein the DNS communications analyzer is configured for identifying a distinct query count associated with a registered level-domain for each of a plurality of clients over a specified time period and a data transfer direction between said plurality of clients and one or more servers, and categorizing said DNS communications based on session features associated with query type, wherein said categorization is based on transfer capability, server response, and query type diversity.

9. The apparatus of claim 8 wherein said DNS communications comprise queries and analyzing said DNS communications further comprises analyzing lexical features of said queries.

10. The apparatus of claim 8 wherein categorizing said DNS communications comprises categorizing usage based on client count.

11. The apparatus of claim 8 wherein dynamic DNS domains are identified as public suffixes.

12. The method of claim 1 further comprising categorizing the transfer capability by the server response.

13. The method of claim 1 further comprising breaking down features into said session features, lexical features, and active profiling.

14. The method of claim 2 wherein said lexical features describe characters within the query and are used to identify client-to-attacker traffic and attacker-to-client traffic.

15. The method of claim 2 wherein signature-based encoding detection is used to identify said lexical features.

16. The method of claim 1 further comprising using said query type and said server response to categorize bidirectional and attacker-to-client unidirectional transfers, using lexical analysis to detect data fields, and using active probing to identify client-to-attacker unidirectional transfers.

* * * * *